June 22, 1965 F. HEFTI 3,191,095

PRINTED CIRCUIT

Filed Jan. 24, 1961 2 Sheets-Sheet 1

Inventor:
Frederic Hefti
by
McGlew and Toren
His Attorneys

June 22, 1965 F. HEFTI 3,191,095

PRINTED CIRCUIT

Filed Jan. 24, 1961 2 Sheets-Sheet 2

Inventor:
Frederic Hefti
by McGlew and Toren
his attorneys

United States Patent Office 3,191,095
Patented June 22, 1965

3,191,095

PRINTED CIRCUIT

Frederic Hefti, Hochweid, Ebikon, near Lucerne, Switzerland

Filed Jan. 24, 1961, Ser. No. 84,649
Claims priority, application Switzerland, Feb. 1, 1960, 1,149/60
4 Claims. (Cl. 317—9)

The present invention relates to a printed circuit provided with a safety arrangement.

As is known, in the case of electronic apparatus equipped with printed circuits, a plurality of conductor plates are used, according to the extent of the circuit. Here it frequently proves advantageous to lead individual measurement points and connection points of the structural elements of a conductor plate in comb fashion to one of its edges. The conductor plate is then pushed into a contact strip, so that with simultaneous retention of the conductor plate a simple interchangeability is ensured.

The use of conductor plates for pushing into contact strips in fact facilitates the separation and removal of a conductor plate from the remainder of the circuit, but involves the disadvantage that the remainder of the installation also remains switched on after removal of the plate. Under some circumstances this can lead to destruction of the other parts of the electronic apparatus and to the uncontrolled continuance of work of the installation. Possible oxidation of the contact surfaces in the contact strips, or exchanging of different conductor plates with one another can also have the same effect, when the installation is switched on.

The present invention has the purpose of providing a safety arrangement by which a safety current circuit of the installation is automatically interrupted in the case of a possible removal, exchange or failure of the contact connections of the conductor plates of a printed circuit divided into individual structural groups.

The printed circuit, provided with a safety arrangement, possesses a conductor plate with comb-like edge, and a matching contact strip. The novelty consists in that two selected contacts of each contact strip lie in the current circuit of a safety switch, and interrupt this current circuit, the connection points of the side plates which co-operate with the selected contacts possessing a direct connection, so that on correct fitting together of the contact strip and the conductor plate the interruption of the current circuit of the safety switch is bridged over by the corresponding connection points of the conductor plate.

Figure 1:
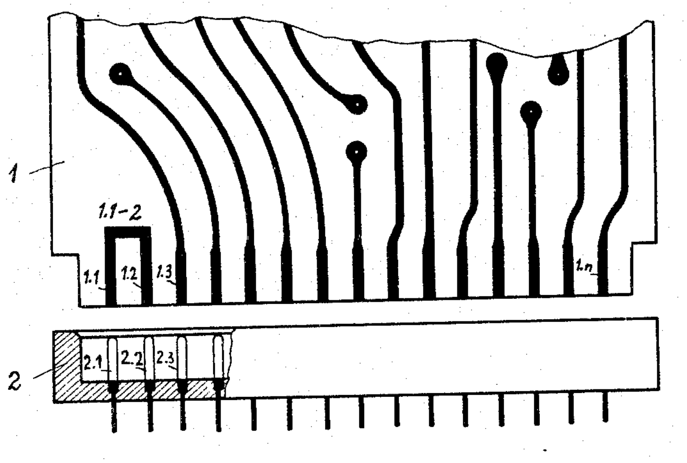
Figure 2:
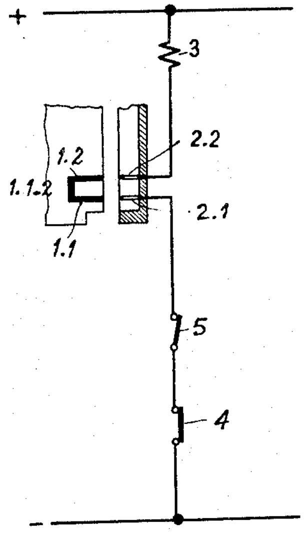
Figure 3:
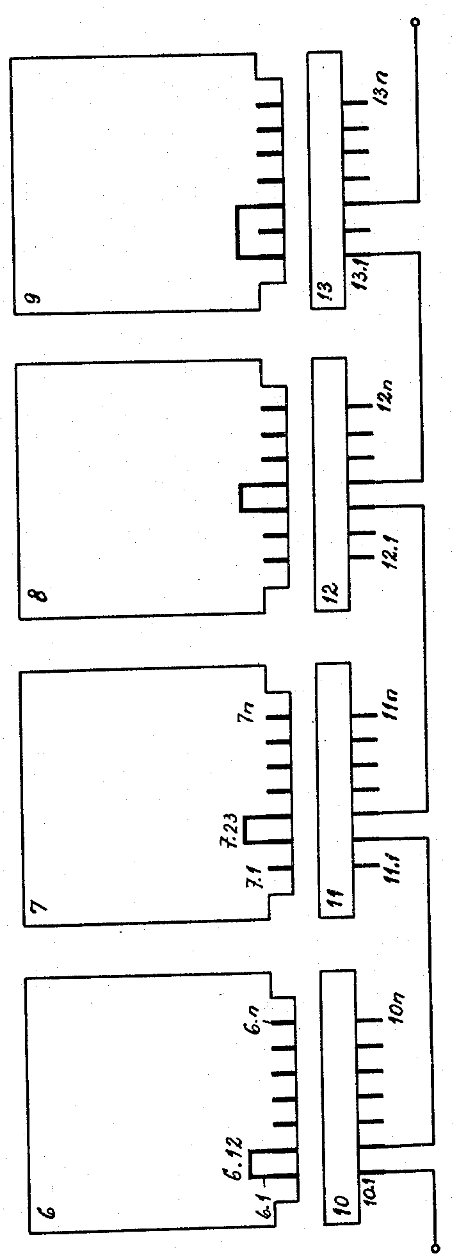

Examples of embodiment of the object of the invention are illustrated in the accompanying drawings, wherein:

FIGURE 1 shows the arrangement of the safety device in combination with a circuit arrangement possessing one single conductor plate with contact strip, FIGURE 2 shows the circuit arrangement of the safety current circuit, and FIGURE 3 shows the arrangement of the safety device in combination with a printed circuit having a plurality of conductor plates with contact strips.

In the drawings, in FIGURE 1, 1 designates a conductor plate, only partially illustrated, of a printed circuit, which possesses connection points 1.1, 1.2, . . . 1.$n$, which are conducted in comb fashion to the edge of the conductor plate 1. The circuit arrangement is further provided with a suitable contact strip 2, which possesses resilient contact terminals 2.1 . . . 2.$n$. 1.1–2 designates a connection, printed on to the conductor plate 1, between two selected contacts 1.1 and 1.2.

The two contact terminals 2.1 and 2.2 are connected to a safety current circuit, as appears from FIGURE 2. The safety current circuit possesses a direct current source with + and − terminals, which serves for the feeding of the operating winding of a main relay 3. The main relay 3 effects the switching on and off of the critical part of the installation. 4 and 5 designate two of a number, determined according to the installation, of safety contacts of other safety arrangements.

The safety arrangement as described and represented in FIGURES 1 and 2 works as follows:

It is assumed that the contacts 4 and 5 are closed. By pushing of the conductor plate 1 into the contact strip 2 the contact terminals 2.1, 2.2 are short-circuited through the printed connection 1.1–2, so that the main relay 3 pulls up. In the case of removal of the conductor plate 1 or incomplete contact in the contact strip 2 the current circuit of the coil 3 is interrupted, so that the main relay 3 drops off.

In FIGURE 3 there is illustrated a further embodiment of the object of the invention, wherein four conductor plates 6, 7, 8, 9 with connection points 6.1 to 6$n$, 7.1 to 7$n$, 8.1 to 8$n$ and 9.1 to 9$n$ are present. The pertinent contact strips 10, 11, 12 and 13 are again provided with resilient contact terminals 10.1 to 10$n$, 11.1 to 11$n$, 12.1 to 12$n$ and 13.1 to 13$n$. Each conductor plate 6, 7, 8 and 9 possesses two selected connection points 6.1, 6.2; 7.2, 7.3; 8.3, 8.4 and 9.1, 9.3 respectively, which are short-circuited through printed connections 6.12, 7.23, 8.34 and 9.13. Thus the connections in each case in the conductor plates are shifted in relation to one another, a different combination of the connection points being selected for each plate. The pertinent contact terminals 10.1, 10.2; 11.2, 11.3; 12.3, 12.4 and 13.1, 13.3 respectively of the contact strips 10, 11, 12 and 13 are so connected with one another that when the conductor plates 6, 7, 8 and 9 are correctly inserted, the printed connections 6.12, 7.23, 8.34 and 9.13 lie in series connection. Similarly to the safety arrangement according to FIGURE 1, this series connection is connected into the safety current circuit according to FIGURE 2.

The last-described safety arrangement according to FIGURE 3 works as follows:

When the conductor plates 6, 7, 8 and 9 are pushed into the corresponding contact strips 10, 11, 12, 13, when the safety contacts 4, 5 are closed the main relay 3 pulls up. On removal of one or more conductor plates the safety current circuit is interrupted. Exchanging of the conductor plates in their insertion has the same effect. A possible oxidation of the contact surfaces of a structural group also effects an interruption of the safety current circuit.

Here according to the number of conductor plates, a certain number of connection points on each conductor plate are to be reserved for the safety arrangement. In the case of a number $m$ of reserved connection points, at the most $$\frac{m^2-m}{2}$$

conductor plates can be secured against exchange. The reserved connection points not needed by the safety connection in each case can be left empty, or used for a high-ohmic network.

What I claim is:

1. A printed circuit provided with a safety arrangement for operating a safety device such as for cutting off the power to the circuit when the circuit is not properly connected, comprising at least one conductor plate with a comb-like edge having connection points and a matching contact strip for each conductor plate, characterized in that two selected contacts of each contact strip lie in the current circuit of a safety switch and interrupt this current circuit, a full current and voltage responsive relay in said current circuit for switching on or off an electrically operated element, the connection points co-operating with the selected contacts of each conductor plate possessing a direct connection, so that on correct fitting together of the contact strip and the conductor plate the interruption of the current circuit of the safety switch is bridged over by the corresponding connection points of the conductor plate to energize said relay.

2. A printed circuit as claimed in claim 1, characterized in that it possesses a plurality of conductor plates with contact strips, the selected contact pairs of the conductor plates being different in the case of each plate.

3. A printed circuit as claimed in claim 1 characterized in that the contacts of the contact strips co-operating with the selected conductor plates are connected in series with one another and with the safety switch.

4. Safety arrangement for insuring proper connections of an electrical circuit comprising at least one conductor plate having a printed circuit thereon and having an edge with connection points, a matching contact strip for said conductor plate, said contact strip having a plurality of contacts thereon at least two of which are oriented for connection to connection points of said printed circuit which present a direct interconnection, a current circuit connected to said selected contacts including a direct current source connected thereacross and a holding relay connected from one terminal of said direct current source to one of said contact strips, said holding relay being responsive to full current and voltage and arranged for electrically connecting and disconnecting said printed circuit, said connection points and said contacts being arranged so that only on correct fitting together of said contact strip and said conductor plate will the interruption of the current circuit be bridged over by the corresponding connection points of the printed circuit of said conductor plates to actuate said relay.

References Cited by the Examiner

UNITED STATES PATENTS

| | | | |
|---|---|---|---|
| 2,065,820 | 12/36 | Mellon | 317—135 |
| 2,947,964 | 8/60 | Johanson. | |

OTHER REFERENCES

Allied Radio Corporation Knight 10 W Hi Fi Amplifier, 9–52–2M–DT, Bulletin 38–059, September 1952.

SAMUEL BERNSTEIN, *Primary Examiner.*